UNITED STATES PATENT OFFICE

3,819,675
CATIONIC UNSATURATED AMINE-FUNCTIONAL SILANE COUPLING AGENTS

Edwin P. Plueddemann, Midland, Mich., assignor to Dow Corning Corporation, Midland, Mich.
No Drawing. Application Dec. 17, 1970, Ser. No. 99,228, which is a continuation-in-part of abandoned application Ser. No. 825,035, May 15, 1969. Divided and this application Jan. 15, 1973, Ser. No. 323,595
Int. Cl. C07f 7/10, 7/18
U.S. Cl. 260—448.8 R    10 Claims

ABSTRACT OF THE DISCLOSURE

Organosilicon compounds of the formula

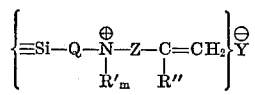

in which

Q is a divalent hydrocarbon radical or a divalent hydrocarbon radical containing oxygen in the form of —COC—,

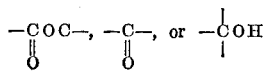

groups or nitrogen in the form of

groups;
Z is a divalent organic radical having a double bond conjugated with the

moiety, Z being bonded to the nitrogen atom by a C—N bond;
R' is independently selected from the group consisting of the hydrogen atom, lower alkyl radical or a heterocyclic organic compound containing the nitrogen atom as a ring member;
m is an integer of 1 or 2;
R" is the hydrogen atom or a lower alkyl radical; and
Y is an acid anion; are disclosed.

The compounds, for example

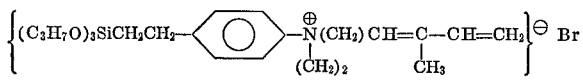

as coupling agents for promoting the adhesion of organic polymers to solid inorganic surfaces.

---

This is a division of application Ser. No. 99,228, filed Dec. 17, 1970; which in turn is a continuation-in-part of application Ser. No. 825,035; filed May 15, 1969; now abandoned.

Organosilicon compounds having amino substituents have attained considerable commercial success as coupling agents to improve the adhesion of certain polymeric materials to siliceous substrates. Aminopropyl-substituted silanes and aminoethylaminopropyl-substituted silanes are representative of the organosilicon compounds utilized in such bonding applications in conjunction with phenolic and melamine type resins. Ethylenically unsaturated silanes, such as vinyltrichlorosilane, are used in these applications when bonding with vinylic polymers. To date, the amine-functional silanes have not been used as the sole component of coupling agents for vinylic polymers.

It has been found that the compositions claimed herein provide excellent adhesion of organic polymers to siliceous surfaces, for example, when the unsaturated amine-functional silanes of the invention are applied in their cationic form to siliceous reinforcing surfaces the adhesion of vinylic polymers to the surface is greatly improved. The compositions of the invention can also be used as a sizing on glass fibers to minimize the build-up of static charge on the fibers.

Thus, it is an object of the invention to provide novel cationic organosilicon compounds which have utility as coupling agents.

It is another object of the invention to provide high strength articles made from vinylic polymers and siliceous reinforcing materials.

The compositions of the invention have the general formula

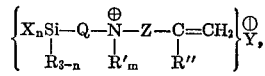

and partial condensates thereof, in which

X is the hydroxyl group or a hydrolyzable radical;
R is a lower alkyl radical;
Q is a divalent hydrocarbon radical or a divalent hydrocarbon radical containing oxygen in the form of —COC—,

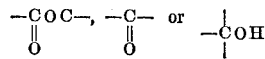

groups or nitrogen in the form of

R' is independently selected from the group consisting of the hydrogen atom, a lower alkyl radical or a heterocyclic organic compound containing the nitrogen atom as a ring member;
m is an integer of 1 or 2;
Z is a divalent organic radical having a double bond conjugated with the

moiety, Z being bonded to the nitrogen atom by a C—N bond;
R" is the hydrogen atom or a lower alkyl radical;
n is an integer having a value of from 1 to 3 inclusive; and
Y is an acid anion.

As described above, X is the hydroxyl group or a hydrolyzable radical, such as alkoxy radicals, for example, methoxy, ethoxy, isopropoxy, butoxy and isobutoxy; aryloxy radicals, for example, phenoxy; halogen atoms, for example, chlorine, bromine and fluorine; acyloxy radicals, for example, acetoxy, propionoxy and decanoxy; ketoxime radicals, for example,

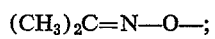

and amine radicals for example, $CH_3NH-$, $NH_2-$ and $(C_2H_5)_2N-$. As used herein "hydrolyzable group" is taken to mean any radical which will react with water at room temperature to form a silanol.

R is a lower alkyl radical containing no more than 6 carbon atoms, for example, methyl, ethyl, isopropyl, butyl or a hexyl radical. The same or different R substituents can be attached to the same silicon atom.

For purposes of this invention, the linking group, Q, between the silicon atom and the nitrogen atom, is composed of carbon, hydrogen and oxygen, the latter being in the form of carbonyl, ether, ester and hydroxyl groups or nitrogen in the form of an amine group. Specific examples of Q are divalent hydrocarbon radicals such as the propylene radical, the $(-CH_2-)_6$ radical, the $(-CH_2-)_{10}$ radical and $(-CH_2-)_{18}$ radical and branched chain radicals such as $$-CH_2\overset{CH_3}{\underset{|}{C}}CH_2-;$$

carbonyl groups such as $$-(CH_2)_3-\overset{O}{\underset{\|}{C}}CH_2CH_2-;$$

ether radicals such as $-CH_2CH_2CH_2OCH_2CH_2CH_2-$, and $-CH_2CH_2CH_2(OCH_2CH_2)_2OCH_2CH-$; ester groups such as $$-CH_2CH_2CH_2O\overset{O}{\underset{\|}{C}}CH_2CH_2,$$

$$CH_3OOC\overset{CH_3}{\underset{|}{CH}}COO(CH_2)_3- \text{ and } -CH_2CH_2CH_2O-\overset{O}{\underset{\|}{C}}-\overset{CH_3}{\underset{|}{CH}}CH_2-;$$

or groups containing hydroxyls such as $$-CH_2CH_2CH_2\overset{OH}{\underset{|}{CH}}CH_2CH-;$$

or a combination of such groups as $$-CH_2CH_2CH_2OCH_2\overset{OH}{\underset{|}{CH}}CH_2-.$$

Also, Q can contain nitrogen, for example
$-CH_2CH_2CH_2NHCH_2CH_2-$, $$-(CH_2)_3-\underset{\underset{C_2H_5}{|}}{N}-(CH_2)_3- \text{ and } -\langle O \rangle-\underset{\underset{CH_3}{|}}{N}-(CH_2)_2-.$$

R' is independently selected from the group consisting of the hydrogen atom, a lower alkyl radical such as described with respect to R or heterocyclic organic compound containing the nitrogen atom as a ring member, for example,

[heterocyclic structures: morpholine-like, pyrrolidine, pyrrole, methylpyrrole]

Of course when R' is such a heterocyclic compound, $m$ is equal to 1, whereas when R' is a hydrogen or lower alkyl radical, $m$ is equal to 2.

Z is a divalent organic radical composed of carbon, hydrogen and oxygen such as described with respect to the Q radical, further characterized as having a double bond conjugated with the vinylic moiety. Z is bonded to the nitrogen by a carbon-nitrogen bond. Illustrative of such divalent radicals are arylene radicals, such as the phenylene, biphenylene, $$-CH_2-\langle O \rangle-, \text{ and } -CH_2CH_2-\langle O \rangle-\langle O \rangle-$$

radicals; carbonyl radicals, for example $$-CH_2CH_2-O-\overset{O}{\underset{\|}{C}}-, \quad -\overset{}{\underset{(CH_3)_2}{C}}CH_2-O-\overset{O}{\underset{\|}{C}}-, \quad -CH_2\overset{}{\underset{OH}{CH}}CH_2-\overset{O}{\underset{\|}{C}}- \text{ and }$$

$$-\langle O \rangle-CH_2-\overset{O}{\underset{\|}{C}}-,$$

and vinylic groups, such as $$-\langle O \rangle-CH_2-\overset{}{\underset{CH_2}{\underset{\|}{C}}}-, \quad \overset{CH_2-\overset{}{\underset{CH_3}{\underset{\|}{C}}}-}{\underset{}{}} \text{ and } -(CH_2)_4-\overset{}{\underset{C_2H_5}{\underset{\|}{C}}}-.$$

R'' is the hydrogen atom or a lower alkyl radical such as described with respect to R.

Y is a halogen atom; chlorine, bromine, or iodine; or other acid anion, such as carboxylate anions; for example, formate and acetate anions; the phosphate anion, the sulfate anion; the nitrate anion and the like.

Thus the following are illustrative of compounds within the scope of the invention:

$$\{(CH_3O)_3Si(CH_2)_3NH(CH_2)_2\overset{\oplus}{\underset{H_2}{N}}-\langle O \rangle-CH=CH_2\}^{\ominus}Cl$$

$$\{(C_3H_7O)_2Si-CH_2-\langle O \rangle-CH_2CH_2CH_2\overset{\oplus}{\underset{CH_3}{NH}}-\atop \langle O \rangle$$

$$\langle O \rangle-\underset{C_2H_5}{\underset{|}{C}}=CH_2\}CH_3C\overset{O}{\underset{O}{\|}}{}^{\ominus}$$

$$\{(CH_3O)_3Si-(CH_2)_3\overset{\oplus}{\underset{\underset{CH_3}{|}}{\underset{CH_3}{N}}}CH_2CH_2NHCH_2CH_2-O-\overset{O}{\underset{\|}{C}}-CH=CH_2\}^{\ominus}Cl,$$

$$\{Cl_2SiCH_2CH_2CH_2\overset{\oplus}{\underset{(C_2H_5)_2}{N}}CH_2CH_2\overset{O}{\underset{\|}{C}}-\overset{}{\underset{CH_3}{C}}=CH_2\}^{\ominus}Br,\atop CH_3$$

$$\{(C_2H_5O)_3SiCH_2CH_2CH_2OCH_2\overset{\oplus}{\underset{CH_3}{N}}HCH_2CH_2\overset{}{\underset{\underset{C_2H_5}{|}}{\underset{CH}{C}}}-CH=CH_2\}^{\ominus}Cl$$

$$\{(CH_3O)_2Si(CH_2)_{12}\overset{\oplus}{\underset{\underset{H_2}{|}}{N}}-CH_2CH_2-\atop C_3H_7$$

$$\langle O \rangle-CH=CH_2\}CH_3C\overset{O}{\underset{O}{\|}}{}^{\ominus}, \text{ and}$$

$$\{(C_4H_9)_2SiCH_2-\overset{O}{\underset{\|}{C}}-\overset{}{\underset{H_2}{CH_2\overset{\oplus}{N}}}-CH_2CHCH_2CH_2O\overset{}{\underset{OH}{C}}-\overset{O}{\underset{\|}{C}}=CH_2\}^{\ominus}HSO_4.\atop OH \quad\quad\quad\quad CH_3$$

Partial condensates of the cationic unsaturated amine-functional silanes are also within the scope of the invention. "Partial condensate" is meant to imply that a detectable amount of the hydroxyl or hydrolyzable groups remain uncondensed in the compositions, preferably at least one such group per every four silicon atoms remains uncondensed. The partial condensate is a polymer of —SiOSiO— units with the silicon atoms retaining their cationic functionality and the requisite amount of hydroxyl groups, the hydroxyl or hydrolyzable groups being available to form bonds with inorganic substrates when the polymer is used as a coupling agent or primer.

The compounds of the invention can be prepared by reaction of a conjugated unsaturated alkylhalide with an aminofunctional silane. This reaction is carried out in a suitable solvent, with conditions of time and temperature varying widely. A second method of preparation, analogous to the first, is the reaction of silyl-substituted alkylhalide with a conjugated unsaturated aliphatic amine to produce the cationic compounds. Both of these reactions are carried out in a suitable solvent, such as dimethylformamide, 1-methoxy-2-propanol, 1-2-dimethoxyethane, tertbutyl alcohol, isopropanol, methanol and diacetone alcohol. Certain of the cationic compounds are obtained by dissolving the neutral unsaturated secondary and tertiary amine in an acid solution, such as dilute sulfuric acid. These methods of producing the compounds are illustrated in detail in the examples.

The cationic unsaturated amine-functional silanes are soluble in aqueous media to the extent that at least 5 weight percent solutions are readily formed. These solutions can be applied to solid inorganic materials by conventional techniques such as dipping, brushing or spraying. The solid inorganic material treated in this manner then has attached to its surfaces the hydrolyzate of the formula

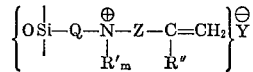

in which all radicals are as previously defined.

This hydrolyzate may be in the form of a partial condensate in which a dectectable amount of hydroxyl or hydrolyzable groups (preferably at least one such group per every four silicon atoms) remain uncondensed and are then available for reaction with sites on the inorganic surface to provide chemical bonding. Although not wishing to be bound by theory, it is believed that the ≡SiOH radicals in the coupling agent react with silicon-bonded hydroxyl groups on siliceous surfaces or with metal oxides on metal surfaces to form the chemical bond. Contrary to this theory, and thus unexpectedly, certain amine hydrochlorides of the invention provide increased adhesion between vinylic polymers, such as acrylates and gold, a metal which is not subject to oxidation.

Cationic treated siliceous materials can be combined with organic resins, such as polyester-styrene resins, to provide reinforced articles. Superior strength is imparted to these articles because the interface of the resin and the siliceous material is formed by reaction of the organic polymer and cationic compound in one instance and the reaction of ≡SiX groups and water on the solid in the other instance. It is believed that the enhanced properties of such a composite are, at least in part, provided by an ordering or alignment of molecules at the interface which is a result of their cationic nature.

Organic polymers include thermoplastic and thermosetting polymeric materials, both of the condensation type, such as the polyamides and the vinylic type, such as the polyolefins. Representative of condensation polymers are the acetal polymers, such as made by the copolymerization of propylene oxide and formaldehyde; alkyd resins, such as are synthesized by reacting a saturated polybasic acid with a polyol; amino resins, such as the reaction products of urea or melamine with formaldehyde; epoxy resins, such as those derived from bisphenol A and epichlorohydrin; phenolic resins, both resols and novolaks; polyamides, such as the reaction product of hexamethylene diamine and adipic acid; polycarbonates, such as the reaction products of bisphenol A and a carbonate diester; polyester resins, such as poly(ethylene terephthalate), and polysulfone resins, such as those made by the reaction of the disodium salt of bisphenol A and 4,4'-dichlorodiphenylsulfone. The aliphatically unsaturated monomers suitable for polymerization and fabrication of the above-described reinforced composite include styrene, acrylonitrile-butadiene-styrene, acrylonitrile-styrene, isobutene, styrene-butadiene, ethylene, propylene, vinylacetal, vinylchloride-vinylidene, methylmethacrylate, and ethylene-propylene-cyclohexadiene. The polymers, formed by polymerization of the aliphatically unsaturated carbon-carbon bonds, can be rigid materials, such as polyester resins or elastomeric materials, such as styrene-butadiene rubber, and as a class are conveniently designated as "vinylic polymers." When vinylic polymers are used in combination with unsaturated amines of the invention, especially the amine hydrochlorides, it may be desirable to add a free radical initiator to promote reaction between the polymer and the unsaturation of the amine. The free radical source should be one which is active at the bonding temperature, thus, dicumyl peroxide is preferred for use with polypropylene, and benzoyl peroxide is preferred for use with styrene-containing polymers.

Solid siliceous materials commonly used for reinforcing organic polymers include glass, in the form of cloth, strands and chopped fibers; silica, asbestos, mica, talc, and quartz. An additional advantage is realized when fibrous materials are treated since the cationic compounds minimize the build-up of static charge in the fibers and thereby facilitate the handling of strands, rovings and the like.

As an alternative to treating the solid reinforcing material and then forming the composite, the cationic compounds of the invention can be copolymerized with the unsaturated monomers, such as methylmethacrylate, styrene and vinyl acetate, to form a vinylic polymer which in turn can be combined with untreated reinforcing material to form the composite. Generally the copolymers of the invention contain from 0.5 to 5 mol percent of the cationic amine-functional units. The copolymers are produced by vinylic polymerization with conventional catalysts by emulsion polymerization, solution polymerization and other methods which are well known for polymerization of the particular monomer. Of course, the vinylic polymers must be in such a physical state (i.e.; softened or melted) that the untreated reinforcing material can be incorporated therein or laminated thereto.

Also, within the scope of the invention is the formation of the cationic coupling agents in situ during production of composite articles. This can be accomplished by coating the substrate or reinforcing material with one reactant necessary to the formation of the cationic compound and coating the solid vinylic polymer with the other reactant. For example, when polyethylene film is dipped in a solution of vinylbenzyl chloride and then pressed at temperatures of about 200° C. onto aluminum panels primed with n-beta-(aminoethyl)-gamma-amino-propyltrimethoxysilane, a strong bond between the aluminum and polyethylene is obtained.

In addition to their utility as coupling agents on siliceous reinforcing materials, the cationic compositions of the invention are primers for bonding other inorganic solids, for example metals, such as aluminum, magnesium, zinc, tin, chromium, titanium or steel to the organic polymers. The alkaline minerals are another class of inorganic solids useful in the formation of composite articles. Polyester castings utilizing an amine hydrochloride coupling agent and filled with granular calcium phosphate show much greater flexural strength than the same type of casting in which the coupling agent was omitted. Calcium phosphate is one of the principal components of tooth enamel, thus the amine hydrochlorides have utility as adhesive aids in dental restorations.

The amine hydrochlorides of the invention (wherein at least one R' radical is a hydrogen atom) are especially useful as primers for increasing the adhesion of vinylic polymers to gold. This is unexpected since gold does not oxidize, and it is generally thought that an oxidized or hydroxylated surface is necessary to obtain good bonding. Good adhesion of vinylic polymers, such as the acrylic resins, to gold surfaces is of special importance in the fabrication of dental restorative prosthetic devices.

The copolymeric cationic materials of the invention also exhibit the increase in bond strength. For example, when copolymerized with acrylic esters, the cationic acrylate forms a thin hard film, which when cured, adheres tenaciously to common structural material, such as steel or ceramic surfaces. The copolymers can be pigmented and used as paint compositions.

The following examples are illustrative of the invention, which is properly delineated in the appended claims.

EXAMPLE 1

A mixture of 50 grams of 3-chloropropyltrimethoxysilane (0.25 mol), 0.5 grams of methyliodide, 50 grams of 2-(dimethylamino)ethyl methacrylate (0.32 mol), 100 grams of dimethylformamide and 0.5 grams of sulfur was maintained at 95° C. for 24 hours, after which time titration showed 0.21 equivalents of halide ion present. After a total of 50 hours heating at 95° C., titration showed 0.25 equivalents of halide ion present and the reaction was considered complete. The product,

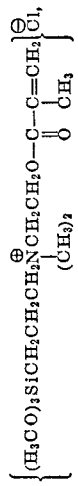

$$\{(H_3CO)_3SiCH_2CH_2CH_2\overset{\oplus}{N}CH_2CH_2O-\underset{O}{C}-\underset{CH_3}{C}=CH_2\}\overset{\ominus}{Cl},$$
$$(CH_3)_2$$

was soluble in water, giving a slightly hazy foamy solution which was stable.

In the above described manner, the following organofunctional amines were reacted with the indicated organofunctional alkyl halides in 50% solutions in the indicated solvents until titration indicated at least 95% of the theoretical amount of halide ion to be present. Reactants and conditions are listed in Table I.

Compositions 1–11, 15 and 16 are quaternary ammonium halides, while compositions 12, 13 and 14 are hydrochlorides of secondary and tertiary amines. Compositions 15 and 16 are not within the scope of the invention—they have isolated terminal saturation and were produced for comparison as coupling agents. Those products within the scope of the invention (1–14) have terminal unsaturation which is activated by conjugation with double bonds or aromatic rings. All of the products formed cationic dispersions in water.

EXAMPLE 2

Heat-cleaned 181 (Style E) glass cloth was dipped into 0.2% aqueous dispersions of the reaction mixtures of Example 1 (which were 50% solvent) providing a 0.1% concentration of the cationic coupling agent. The treated glass cloth was air-dried for one hour and then heated for 7 minutes at 100° C. The glass cloth treated with amine hydrochlorides (compositions 12 and 14) was rinsed in a 1% aqueous ammonia solution before drying.

Laminates, which contained 14 plies of the treated glass cloth (laid up with the warp rotated 90° in alternate plies) impregnated with a polyester resin, were prepared. The laminates were cured for 30 minutes at 30 p.s.i. and 100° C. to form molded sheets having a thickness of about 120 mils and containing about 30 percent by weight of the cured polyester resin. The resin utilized in the laminates was a solution of 70 parts linear polyester in 30

TABLE I

| Composition | Amine Formula | Amine Amount (grams) | Halide Formula | Halide Amount (grams) | Solvent | Temp. (°C.) | Time (hrs.) |
|---|---|---|---|---|---|---|---|
| 1 | $CH_2=C(CH_3)COOCH_2CH_2N(CH_3)_2$ | 50 | $(CH_3O)_3Si(CH_2)_3Cl$ | 50 | Dimethylformamide | 95 | 50 |
| 2 | $CH_2=C(CH_3)COOCH_2CH_2N(CH_3)_2$ | 80 | $(CH_3O)_3Si(CH_2)_3CH_2Cl$ | 75 | 1-methoxy-2-propanol | 100 | 20 |
| 3 | $CH_2=C(CH_3)COOCH_2CH_2N(CH_3)_2$ | 45 | $(CH_3O)Si(CH_3)_2CH_2Cl$ | 35 | do. | 100 | 20 |
| 4 | $CH_2=C(CH_3)COOCH_2CH_2N(CH_3)_2$ | 4 | $(CH_3O)_3Si$—⟨C₆H₄⟩—$CH_2Cl$ | 5 | t-Butyl alcohol | 100 | 1 |
| 5 | $CH_2=C(CH_3)COOCH_2CH_2N(CH_3)_2$ | 2 | $(CH_3O)_3Si$—⟨C₆H₄⟩—$CH_2Br$ | 3 | 1-2 dimethoxyethane | 50 | 0.5 |
| 6 | $CH_2=C(CH_3)COOCH_2CH_2N(CH_3)_2$ | 2 | $(CH_3O)_3Si$—⟨C₆H₄⟩—$CH_2Cl$ | 3 | do. | 25 | 8 |
| 7 | $CH_2=C(CH_3)COOCH_2CH_2N(CH_3)_2$ | 16 | $(CH_3O)_3SiCH_2Cl$ | 17 | Dimethylformamide | 95 | 40 |
| 8 | $CH_2=C(CH_3)COOCH_2CH_2N(CH_3)_2$ | 4 | $(CH_3O)_3SiCH_2CH_2$—⟨C₆H₄⟩—$CH_2Cl$ | 5 | t-Butyl alcohol | 100 | 1 |
| 9 | $CH_2=C(CH_3)COOCH_2CH_2N(CH_3)_2$ | 20 | $(CH_3O)_3SiCH_2COOCH_2CH_2Cl$ | 15 | t-Butyl alcohol and dimethylformamide | 125 | 10 |
| 10 | $CH_2=C(CH_3)COOCH_2CH_2N(CH_3)_2$ | 2 | $CH_2=CH$—⟨C₆H₄⟩—$CH_2Cl$ | 1.5 | 1-Propanol | 100 | 1 |
| 11 | $CH_2=C(CH_3)COOCH_2CH_2NH(t\text{-}C_4H_9)$ | 2 | $(CH_3O)_3Si$—⟨C₆H₄⟩—$CH_2Br$ | 3 | 1-2 dimethoxyethane | 90 | 1 |
| 12 | $(CH_3O)_3SiCH_2CH_2CH_2NH(CH_3)$ | 18 | $CH_2=CH$—⟨C₆H₄⟩—$CH_2Cl$ | 13 | 2-methoxyethanol | 110 | 0.5 |
| 13 | $(C_2H_5O)_3SiCH_2CH_2CH_2NH_2$ | 2.2 | Same as above | 1.5 | 2-methoxyethanol | 90 | 1 |
| 14 | $(CH_3O)_3Si(CH_2)_2NHCH_2CH_2NH_2$ | 4.4 | do. | 3.1 | do. | 90 | 0.5 |
| 15 | $(CH_3O)_3SiCH_2CH_2N(CH_3)_2$ | 10 | $CH_2=CHCH_2Cl$ | 8 | Methanol | 68 | 2 |
| 16 | $CH_2=CHOCCH_2CH_2N(CH_3)_2$ | 15 | $(CH_3O)_3SiCH_2CH_2CH_2Cl$ | 20 | 2-methoxyethanol | 115 | 20 | parts styrene monomer, to which was added 0.5 parts benzoyl peroxide dissolved in about 7.5 parts styrene monomer. The linear polyester in the resin mixture was prepared from phthalic acid and maleic acid in equimolar proportions reacted with polypropylene glycol, the 70 percent solution of this polyester in styrene having an acid number of about 35.

The flexural strengths of the laminates were determined in accordance with U.S. Federal Specification L–P 406b Method 1031. Flexural strength was also determined on samples of the laminates which had been immersed in boiling water for 2 hours and then wiped dry, this being a test which is recognized as roughly the equivalent of standing in water at room temperature for one month. The results of the latter test will be referred to hereafter as the "2 Hour Boil" data. The 2 hour boil flexural strength multiplied by 100 and divided the strength of the laminate as molded is reported as the "Percent Retention" of laminate strength. The following results were obtained on the above prepared laminates.

compositions 2 and 3, are effective but to a limited extent when compared with the compositions where $n$ is 3.

EXAMPLE 3

A mixture of 18.7 grams (0.1 mol) of $(CH_3O)_3SiCH_2CH_2CH_2N(CH_3)_2$, 9 grams of methacrylic acid, 10 grams of epichlorohydrin in 40 grams of t-butyl alcohol and 0.1 grams of sulfur (as stabilizer) was refluxed for 3 hours. Titration indicated the presence of 0.1 mol equivalent of chloride ion. The product was

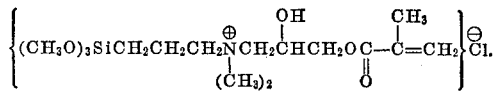

Ten milliliters of the reaction mixture was mixed with 250 milliliters of 1,2-dimethoxyethane to precipitate a granular solid. This solid was separated by filtration and

TABLE II

| Composition | Formula of coupling agent on glass cloth | | Flexural strength, p.s.i. Dry | 2 hr. boil | Percent retention |
|---|---|---|---|---|---|
| 1 | $(CH_3O)_3SiCH_2CH_2CH_2\overset{\oplus}{N}(CH_3)_2CH_2CH_2OCOC(CH_3)=CH_2$ | $\overset{\ominus}{Cl}$ | 90,300 | 79,200 | 88 |
| 2 | $(CH_3O)_2Si(CH_3)CH_2\overset{\oplus}{N}(CH_3)_2CH_2CH_2OCOC(CH_3)CH_2$ | $\overset{\ominus}{Cl}$ | 51,500 | 18,500 | 36 |
| 3 | $CH_3OSi(CH_3)_2CH_2\overset{\oplus}{N}(CH_3)_2CH_2CH_2OCOC(CH_3)=CH_2$ | $\overset{\ominus}{Cl}$ | 59,400 | 32,400 | 55 |
| 4 | $(CH_3O)_3Si\langle\bigcirc\rangle-CH_2\overset{\oplus}{N}(CH_3)_2CH_2CH_2OCOC(CH_3)=CH_2$ | $\overset{\ominus}{Cl}$ | 86,300 | 80,000 | 93 |
| 5 | Same as above | $\overset{\ominus}{Br}$ | 78,600 | 75,900 | 96 |
| 6 | $(CH_3O)_3SiCH_2CH_2CH_2\overset{\oplus}{N}(CH_3)_2CH_2CH_2OCOC(CH_3)=CH_2$ | $\overset{\ominus}{I}$ | 75,900 | 75,000 | 98 |
| 7 | $(CH_3O)_2SiCH_2\overset{\oplus}{N}(CH_3)_2CH_2CH_2OCOC(CH_3)=CH_2$ | $\overset{\ominus}{Cl}$ | 84,000 | 79,000 | 94 |
| 8 | $(CH_3O)_2SiCH_2CH_2\langle\bigcirc\rangle-CH_2\overset{\oplus}{N}(CH_3)_2CH_2CH_2OCOC(CH_3)=CH_2$ | $\overset{\ominus}{Cl}$ | 71,200 | 71,300 | 100 |
| 9 | $(CH_3O)_3SiCH_2CH_2CH_2\overset{\oplus}{N}(CH_3)_2CH_2CH_2OCOC(CH_3)=CH_2$ | $\overset{\ominus}{Cl}$ | | | |
| 10 | $(CH_3O)_3SiCH_2CH_2CH_2\overset{\oplus}{N}(CH_3)_2CH_2\langle\bigcirc\rangle-CH=CH_2$ | $\overset{\ominus}{Cl}$ | 86,300 | 80,000 | 93 |
| 11 | $(CH_3O)_3Si\langle\bigcirc\rangle-CH_2\overset{\oplus}{N}H(t-C_4H_9)CH_2CH_2OCOC(CH_3)=CH_2$ | $\overset{\ominus}{Br}$ | 79,600 | 64,200 | 81 |
| 12* | $(CH_3O)_3SiCH_2CH_2CH_2\overset{\oplus}{N}H(CH_3)CH_2\langle\bigcirc\rangle-CH=CH_2$ | $\overset{\ominus}{Cl}$ | 91,200 | 86,700 | 95 |
| 13 | $(C_2H_5O)_3SiCH_2CH_2CH_2\overset{\oplus}{N}H_2CH_2-\langle\bigcirc\rangle-CH=CH_2$ | $\overset{\ominus}{Cl}$ | 89,000 | 78,100 | 89 |
| 14* | $(CH_3O)_3Si(CH_2)_3\overset{H}{\underset{|}{\overset{\oplus}{N}}}CH_2CH_2\overset{\oplus}{N}H_2CH_2-\langle\bigcirc\rangle-CH=CH_2$ | $\overset{\ominus}{Cl}$ | 87,000 | 80,700 | 93 |
| 15 | $(CH_3O)_3SiCH_2CH_2CH_2\overset{\oplus}{N}(CH_3)_2CH_2CH=CH_2$ | $\overset{\ominus}{Cl}$ | 23,400 | 10,200 | 43 |
| 16 | $(CH_3O)_3SiCH_2CH_2CH_2\overset{\oplus}{N}(CH_3)_2CH_2CH_2OCH=CH_2$ | $\overset{\ominus}{Cl}$ | 33,100 | 18,500 | 56 |
| Control | No coupling agent on glass | | 38,700 | 12,300 | 32 |

*Treated glass was rinsed in dilute aqueous ammonia solution.

The above data demonstrates that the cationic compositions of the invention are highly effective coupling agents, especially when compared with cationic agents, such as compositions 15 and 16 which do not contain the conjugation necessary for activation of the double bond. Because of their stronger bond to the glass, the compounds which have three hydrolyzable groups attached to the silicon are preferred Compositions where $n$ is 1 or 2, as in dried to recover 5 grams of the pure product. The solid was soluble in water and titrated for an Equivalent weight of $370/\overset{\ominus}{Cl}$; theory=$365/\overset{\ominus}{Cl}$.

Glass cloth, treated with an 0.1% aqueous solution of the above product was laminated with polyester resin and tested for flexural strength in the same manner as described in Example 2. Results are tabulated below:

Flexural strength _____ p.s.i.__ 75,400
2 hour boil _____ p.s.i.__ 63,300
Percent retention _____ percent__ 84

EXAMPLE 4

A mixture of 14 grams (0.1 mol) of glycidyl methacrylate and 17 grams (0.1 mol) of $$(CH_3O)_3SiCH_2CH_2CH_2NHCH_3$$

was allowed to stand at room temperature. After 24 hours the product was a clear viscous oil which did not contain any epoxy or free secondary amine. Gas-liquid chromatography indicated that there was no unreacted starting material in the product. Infra-red spectroscopy identified the methacrylate double bond and was consistent with the following proposed structure:

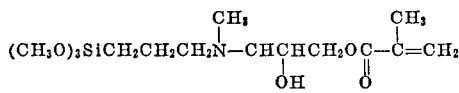

A second nonionic agent was prepared by allowing a mixture of $(C_2H_5O)_3SiCH_2CH_2CH_2CH_2NH_2$ and 1-3-butylene dimethacrylate to react at room temperature. After 2 days the material had reacted to form the two isomers:

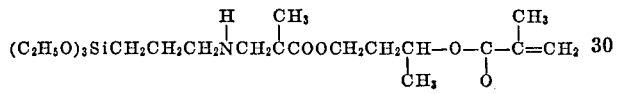

and

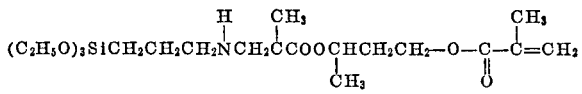

In addition, the reaction mixture contained an equivalent amount of the bis-adduct and a small amount of unreacted butylene dimethacrylate.

A third nonionic agent was prepared by reacting a mixture of 25 grams of

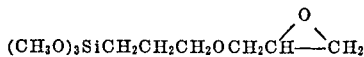

and 18 grams of $CH_2=C(CH_3)COOCH_2CH_2NH(t\text{-butyl})$ with 1 gram tris(dimethylaminoethyl)phenol catalyst and 0.2 grams of sulfur stabilizer at 100° C. for 8 hours. The amber oily product contained only a trace of starting materials and retained the methacrylate double bond as identified by its infra-red spectrum. The product was insoluble in water, but soluble in 50% aqueous acetone or dilute aqueous hydrochloric acid.

A portion of the above products were converted to their cationic form by addition of dilute aqueous hydrochloric acid. The remaining portions of the products were added to dilute aqueous acetone solutions to form a non-ionic treating formulation. Glass microscope slides were treated by soaking for 15 minutes in the hydrochloric or acetone solutions and drying for 30 minutes at room temperature. The polyester resin described in Example 2 was applied to the glass slides and cured for one hour at 100° C. Adhesion of the cured polyester to the treated slides was tested qualitatively by attempting removal of the resin with a razor blade after initial cure and after 3 days immersion in water.

The cationic form (chlorides) proved to be very good coupling agents—the resin adhering strongly to the glass, even after 3 days in water—while the nonionic form of the products (applied from acetone) gave only limited increase in adhesion which was lost after immersion in water.

EXAMPLE 5

The importance of the cationic nature of the compounds of the invention is illustrated by the following: The compound,

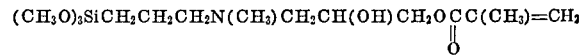

prepared as described in Example 4, was applied to glass cloth from isopropanol-water, dilute aqueous acetic acid and dilute aqueous hydrochloric acid. The cloth was laminated with polyester resin and tested as previously described. The cationic nature of the amine increases in the order given below:

| Solution of amine-functional silane coupling agent | Laminate properties | | |
|---|---|---|---|
| | Flexural strength | | Percent retention |
| | Dry | 2 hr. boil | |
| 0.1% isopropanol-water | 55,200 | 30,000 | 54 |
| 0.5% isopropanol-water | 74,300 | 49,500 | 67 |
| 0.1% dilute acetic acid | 77,000 | 63,600 | 88 |
| 0.1% dilute hydrochloric acid | 80,400 | 62,500 | 78 |

It can be seen that the cationic agents were superior to the same compound applied from the non-ionic isopropanol-water solution. A five-fold increase of coupling agent in the isopropanol-water solution did not give improvement equivalent to the weaker of the two cationic forms, the acetate salt. Comparison of wet strength retention of the laminates also demonstrates the superiority of the cationic form.

EXAMPLE 6

When 2-3 mole percent of

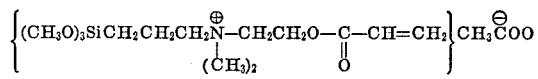

is copolymerized with butadiene to form an elastomer and the copolymeric rubber is then bonded to untreated glass tire cord fabric by techniques conventional in the rubber industry, there is obtained a reinforced rubber article of enhanced strength.

EXAMPLE 7

When 1-5 mol percent of

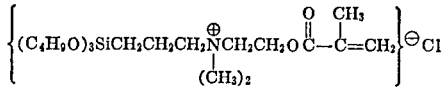

is copolymerized with 95-99 mol percent of a mixture of ethylacrylate, methylmethacrylate as a 40% solution in cellosolve acetate, there is obtained a clear acrylic copolymer, which when filmed on metal surfaces and baked at 150° C. is converted to a clear, hard coating with improved adhesion and solvent resistance.

EXAMPLE 8

To demonstrate the anti-static properties of the cationic compounds of the invention when applied to glass fibers, bundles of glass fibers were dipped in a 1% solution of composition 1 of Example 1. The resistivity of the glass fibers was determined and reported as the log of $r$. For purposes of comparison, the same test was run on glass fibers which had been treated with a commercially-available silane coupling agent, $$(CH_3O)_3Si(CH_2)_3OOCC(CH_3)=CH_2.$$

Results are as follows:

| Coupling agent | Log r |
|---|---|
| $(CH_3O)_3Si(CH_{27})_3\overset{\oplus}{\underset{\ominus}{N}}\underset{Cl}{\overset{(CH_3)_2}{|}}CH_2CH_2O\overset{O}{\overset{\|}{C}}-\overset{CH_3}{\underset{|}{C}}=CH_2$ | 8.01 |
| 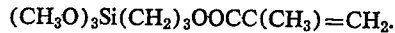 | 10-12 |

The lower log value obtained by use of the cationic composition signifies the better charge dissipation which facilitates handling of the glass fibers.

EXAMPLE 9

Composite articles of wollastonite filled polypropylene were prepared by injection molding. The molding composition was prepared by mixing 100 parts by weight of wollastonite with 0.5 weight percent of an amine hydrochloride coupling agent (Composition No. 14 of Example 1) in a Waring Blendor for one minute. The wollastonite was then mixed with 150 parts by weight of commercially available powdered polypropylene. In certain instances, 5 weight percent of a vinylic monomer and one weight percent of dicumyl peroxide (catalyst) were added to form in situ a cationic amine functional copolymer as the coupling agent. The injection molding apparatus was operated on a 45 second cycle at an injection pressure of 600 p.s.i. at the following temperatures: rear heater, 430° F.; front heater, 470° F.; and mold, 120° F. Flex and tensile bars were molded and tested. The table relates the coupling agents used to the test results. The recorded data are the average of five test results.

| Coupling agent | Strength | | |
|---|---|---|---|
| | Flexural (p.s.i.) | Tensile (p.s.i.) | Flexural modulus (p.s.i.) |
| None | 7,800 | 3,780 | 500,000 |
| Composition 14 of— | | | |
| Example 2 | 10,090 | 4,870 | 556,000 |
| Example 2 plus trimethylolpropane trimethacrylate and dicumyl peroxide | 9,880 | 4,620 | 633,000 |
| Example 2 plus divinylbenzene (55% solution) and dicumyl peroxide | 10,530 | 4,620 | 588,000 |
| Example 2 plus ethylene dimethacrylate | 10,080 | 4,610 | 525,000 |

These data demonstrate the superior strengths obtained by use of the cationic amine functional coupling agents of the invention.

EXAMPLE 10

Clean aluminum panels were wiped with a 10 percent solution of the reaction product of beta-aminoethyl-gammaaminopropyltriethoxysilane and vinylbenzyl chloride in 2-methoxyethanol. The primed panels were air dried for five minutes and then pressed against molten polymers of various chemical structure. The bonding conditions for the different polymers are noted below. All of the polymers are commercially available materials. After cooling to room temperature, adhesion was determined qualitatively by loosening a portion of the polymeric film with a razor blade and pulling. Adhesion was considered nil when the film detached from the panel without pulling and excellent when there was cohesive failure or the film could not be pulled from the panel. Adhesion of the different polymeric films is listed below.

TABLE III

| Polymer | Bonding conditions | | |
|---|---|---|---|
| | Temperature, °C. | Time | Adhesion |
| Polypropylene | 200 | 10 sec | C.F. |
| High density polyethylene | 200 | 1 sec | C.F. |
| Polystyrene | 200 | 1 min | C.F. |
| Polyamide | 300 | 15 sec | C.F. |
| Polycarbonate | 250 | 30 sec | C.F. |
| Polyvinyl acetate | 175 | 1 min | C.F. |
| Cellulose acetate | 225 | 10 sec | Good. |
| Polyvinyl chloride | 200 | 1 min | C.F. |
| Poly(styrene-acrylonitrile) | 225 | 1 min | Good. |
| Poly(acrylonitrile-butadiene styrene) | 225 | 1 min | C.F. |
| Styrene-butadiene elastomer | 225 | 1 min | Very good. |
| Polyformal | 250 | 1 min | C.F. |
| Saturated polyester (Mylar) | 250 | 1 min | C.F. |
| Polysulfone | 275 | 1 min | Fair. |
| Polyvinylidene chloride | 200 | 3 min | C.F. |
| Poly(chlorotrifluoroethylene) | 300 | 1 min | Good. |

NOTE.—C.F. indicates cohesive failure.

These data demonstrate that the coupling agents of the invention are effective with a wide variety of polymers including condensation polymers, such as polycarbonate, and vinylic polymers, such as polystyrene.

EXAMPLE 11

The coupling agent utilized in Example 10 was used to increase the adhesion of molten polyethylene in a variety of substrates. Each substrate was primed with the coupling agent solution described in Example 10. High density polyethylene was then bonded to the primed surfaces by pressing lightly under the conditions indicated. For purposes of comparison, adhesion of polyethylene bonded under the same conditions to unprimed surfaces was also determined. Results are as follows:

TABLE IV

| Substrate | Bonding conditions | | Adhesion | |
|---|---|---|---|---|
| | Temperature °C. | Time | Primed | Unprimed |
| Aluminum | 200 | 3 minutes | C.F. | Poor. |
| Glass | 200 | do | C.F. | Nil. |
| Magnesium | 200 | 1 minute | C.F. | Nil. |
| Nickel alloy | 200 | do | C.F. | Poor. |
| Brass | 200 | 3 minutes | Good | Very poor. |
| Chrome-plate steel | 200 | do | do | Fair. |
| Cold-rolled steel | 200 | do | Very good | Do. |
| Tin-coated steel | 200 | do | Good | Poor. |
| Titanium | 250 | do | do | Very poor. |
| Ceramic tile | 200 | do | C.F. | Nil. |
| Glazed clay tile | 200 | 1 minute | C.F. | Poor. |
| Silver | 200 | do | C.F. | Do. |
| Gold | 200 | do | Very good | Very poor. |

NOTE.—C.F. indicates cohesive failure.

These data demonstrate that the adhesion of vinylic polymers to a variety of inorganic substrates, both siliceous and nonsiliceous, is improved by use of the coupling agents of the invention.

EXAMPLE 12

Bonding in accordance with the present invention was accomplished by the in situ formation of amine hydrochlorides. Glass microscope slides were primed with a 10 percent solution of an amine-functional silane. The solvent was 2-methoxy-ethanol. Granules of a commercially available polypropylene (Profax 2303 from Hercules Incorporated, Wilmington, Del.) were primed with a 10:1 mixture of vinylbenzyl chloride and dicumylperoxide diluted to 10 percent reactive ingredients with 2-methoxyethanol. The treated granules were pressed onto the treated slides for one minute at 250° C., cooled to room temperature and examined for adhesion. For purposes of comparison, the adhesion of untreated polypropylene granules bonded to treated glass slides was also determined. Results are given below:

| Silane on glass | Adhesion to class | |
|---|---|---|
| | Of untreated polymer | Of treated polymer |
| None | Nil | Nil. |
| $(C_2H_5O)_3SiCH_2CH_2CH_2NH_2$ | Very poor | Good. |
| $(CH_3O)_3Si(CH_2)_3NHCH_2CH_2NH_2$ | do | Cohesive failure. |

These results show that the amine hydrochloride was formed in situ and did increase adhesion of the polymer to the glass.

EXAMPLE 13

Adhesion promotion of vinylic resins to alkaline minerals was demonstrated by preparing castings from a mixture of powdered alkaline mineral fillers and a commercially available unsaturated polyester resin. The coupling agent was added to the resin in an amount equivalent to 0.5% by weight based on the weight of filler. Filler content and composition and flex strengths of the cured castings are given below:

| Coupling agent | Flex strength (p.s.i.) of castings filled with— | | |
|---|---|---|---|
| | 48% $CaCO_3$ | 43% $Ca_3(PO_4)_2$ | 43% magnesium silicate |
| None | 9,970 | 4,500 | 10,600 |
| Composition No. 14 of Example 2 | 11,700 | 9,290 | 12,370 |

EXAMPLE 14

Adhesion promotion of vinylic polymers to gold was demonstrated by priming Type III, hard, 20 DWT dental gold with a 5% solution of the same coupling agent used in Example 13 and coating the primed gold with an acrylic dental resin (Vinacryl from Cosmos Dental Products, Inc.). The acrylic resin paste was cured to 140° C. for 30 minutes. Adhesion of the cured acrylate to primed and unprimed gold was compared after cooling to room temperature and after soaking in water. The cured resin showed fairly good dry adhesion to the unprimed gold, being removed only with difficulty, but after soaking in water for eight hours the resin detached of its own accord from the gold. Adhesion of the cured resin to the primed gold was excellent—there was cohesive failure of the resin during attempts to remove it from the primed surface. After soaking in water for three days, attempts to remove the resin from the primed gold surface again resulted in cohesive failure in the resin.

That which is claimed is:

1. A composition of the formula

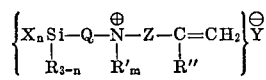

and partial condensates thereof, in which

X is the hydroxyl group or a hydrolyzable radical;
R is a lower alkyl radical;
$n$ is an integer having a value of from 1 to 3 inclusive;
Q is a divalent hydrocarbon radical or a divalent hydrocarbon radical containing oxygen in the form of —COC—,

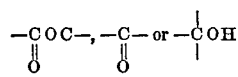

groups or nitrogen in the form of

groups;
R' is independently selected from the group consisting of the hydrogen atom, a lower alkyl radical or a heterocyclic organic compound containing the nitrogen atom as a ring member;
$m$ is an integer of 1 or 2;
Z is an arylene radical having a double bond conjugated with the

moiety, Z being bonded to the nitrogen atom by a C—N bond;
R" is the hydrogen atom or a lower alkyl radical; and
Y is an acid anion.

2. A composition in accordance with claim 1 where $n$ is equal to 3.

3. A composition in accordance with claim 1 wherein $m$ has a value of 2 and at least one R' radical is a hydrogen atom.

4. A composition in accordance with claim 1 wherein Z is a

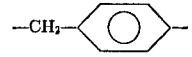

radical.

5. A composition in accordance with claim 1 wherein Q is selected from the group consisting of the formula —CH$_2$—, —(CH$_2$)$_3$—,

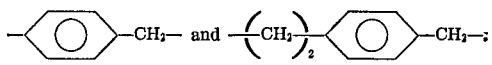

6. A composition in accordance with claim 1 wherein X is methoxy or ethoxy radical.

7. A composition in accordance with claim 6 wherein R' is a methyl radical, R" is the hydrogen atom or a methyl radical and Y is a chloride or acetate anion.

8. A composition in accordance with claim 7 of the formula

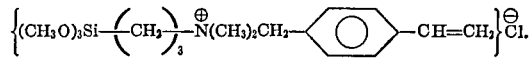

9. A composition in accordance with claim 7 of the formula

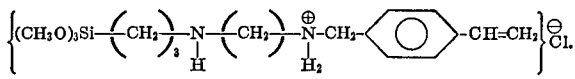

10. A composition in accordance with claim 7 of the formula

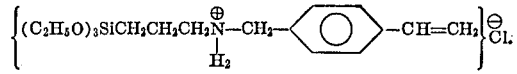

References Cited
UNITED STATES PATENTS

| | | | |
|---|---|---|---|
| 3,373,137 | 3/1968 | Saam | 260—448.8 R X |
| 3,580,920 | 5/1971 | Culpepper | 260—448.8 R X |
| 3,661,963 | 5/1972 | Pepe et al. | 260—448.2 N |

DANIEL E. WYMAN, Primary Examiner

P. F. SHAVER, Assistant Examiner

U.S. Cl. X.R.

117—124 F, 126 GN, 126 GQ; 260—448.2 N